United States Patent
Homma

(10) Patent No.: US 9,945,992 B2
(45) Date of Patent: Apr. 17, 2018

(54) OPTICAL UNIT AND IMAGE PICKUP APPARATUS USING THE SAME

(71) Applicant: OLYMPUS CORPORATION, Hachioji-shi, Tokyo (JP)

(72) Inventor: Hiroyuki Homma, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/717,775

(22) Filed: Sep. 27, 2017

(65) Prior Publication Data

US 2018/0039000 A1 Feb. 8, 2018

Related U.S. Application Data

(63) Continuation of application No. PCT/JP2016/079821, filed on Oct. 6, 2016.

(30) Foreign Application Priority Data

Oct. 29, 2015 (JP) ................. 2015-213357

(51) Int. Cl.
*G02B 5/04* (2006.01)
*G02B 27/12* (2006.01)
*H04N 5/225* (2006.01)

(52) U.S. Cl.
CPC ............ *G02B 5/04* (2013.01); *G02B 27/126* (2013.01); *H04N 5/225* (2013.01)

(58) Field of Classification Search
CPC ........ G02B 5/04; G02B 13/04; G02B 27/126; H04N 5/225; H04N 9/09
USPC ........................................... 359/833
See application file for complete search history.

(56) References Cited

U.S. PATENT DOCUMENTS

| 8,784,301 B2 | 7/2014 | McDowall |
| 2003/0165012 A1* | 9/2003 | Straehle ................. G02B 5/04 359/831 |

FOREIGN PATENT DOCUMENTS

| JP | 2012027228 A | 2/2012 |
| JP | 2013238850 A | 11/2013 |
| JP | 2015169730 A | 9/2015 |

OTHER PUBLICATIONS

International Search Report (ISR) and Written Opinion dated Dec. 20, 2016 issued in International Application No. PCT/JP2016/079821.

* cited by examiner

*Primary Examiner* — Euncha Cherry
(74) *Attorney, Agent, or Firm* — Holtz, Holtz & Volek PC

(57) ABSTRACT

The optical unit includes an objective optical system and a splitting element. The splitting element consists of a first right-angle prism, a second right-angle prism, and a third right-angle prism, and has a surface of incidence and an optical splitting surface. The surface of incidence is provided to the first right-angle prism, and the first right-angle prism is positioned such that the surface of incidence is orthogonal to an optical axis of the objective optical system. The optical splitting surface is provided to a boundary of the second right-angle prism and the third right-angle prism. The second right-angle prism has a first optical path and the third right-angle prism has a second optical path. A first optical image and a second optical image are both formed on the same plane, and an area of the first optical image and an area of the second optical image are separated spatially.

12 Claims, 8 Drawing Sheets

OPTICAL UNIT AND IMAGE PICKUP APPARATUS USING THE SAME

CROSS-REFERENCE TO RELATED APPLICATION

The present application is a continuation application of PCT/JP2016/079821 filed on Oct. 6, 2016 which is based upon and claims the benefit of priority from Japanese Patent Application No. 2015-213357 filed on Oct. 29, 2015; the entire contents of which are incorporated herein by reference.

BACKGROUND OF THE INVENTION

Field of the Invention

The present invention relates to an optical unit and an image pickup apparatus using the same.

Description of the Related Art

An optical unit which forms a plurality of images simultaneously by using one optical system has been proposed in U.S. Pat. No. 8,784,301 Specification, and Japanese Patent Application Laid-open Publication No. 2012-27228.

In U.S. Pat. No. 8,784,301 Specification, an image pickup unit which captures two optical images simultaneously has been disclosed. The image pickup unit includes a lens assembly and a sensor assembly. An optical image of an object is formed by the lens assembly.

The sensor assembly includes a prism structure and an image sensor which is on a same plane. The prism structure includes a prism assembly, a reflector unit, and a prism.

In the sensor assembly, light is split into two at a boundary of the prism assembly and the reflector unit. Accordingly, a first optical path is formed in the prism assembly and a second optical path is formed in the reflector unit. As a result, a first optical image is formed on the first optical path and a second optical image is formed on the second optical path.

A first image pickup sensor is disposed on the first optical path. The first optical image is captured by the first image pickup sensor. A second image pickup sensor is disposed on the second optical path. The second optical image is captured by the second image pickup sensor.

In Japanese Patent Application Laid-open Publication No. 2012-27228, a color image pickup optical system which captures four optical images simultaneously has been disclosed. The color image pickup optical system includes an image pickup lens, a color separation prism, and an image pickup element. The color separation prism is a prism of Koester type.

The color separation prism has a structure in which an equilateral triangle has been divided into two equal parts. By divided the equilateral triangle into two equal parts, the color separation prism is divided into two right-angled triangle members. Each of the two right-angle triangle members has a structure of an equilateral triangle divided into two equal parts.

The color separation prism is provided with a first color separation surface, a second color separation surface, and a third color separation surface. At the first color separation surface, incident light is separated into two color components, and is divided in to light transmitted and light reflected. At the second color separation surface, one of the lights separated at the first color separation surface is separated further into two color components. At the third color separation surface, the other light separated at the first color separation surface is separated further into two color components.

In the color separation prism, a first optical path and a second optical path are formed by the first color separation surface and the second color separation surface, and a third optical path and a fourth optical path are formed by the first color separation surface and the third color separation surface. An optical image is formed in each of the four optical paths.

One image pickup element is disposed on side of a surface of emergence of the color separation prism. Four optical images are captured by the one image pickup element.

SUMMARY OF THE INVENTION

An optical unit of the present invention comprises,
an objective optical system which includes a plurality of lenses, and
a splitting element which is disposed on an image side of the objective optical system, wherein
the splitting element consists of in order from a side of the objective optical system, a first right-angle prism, a second right-angle prism, and a third right-angle prism, and has a surface of incidence and an optical splitting surface, and
the surface of incidence is provided to the first right-angle prism, and
the first right-angle prism is positioned such that the surface of incidence is orthogonal to an optical axis of the objective optical system, and
the optical splitting surface is provided to a boundary of the second right-angle prism and the third right-angle prism, and
the second right-angle prism is positioned such that the optical splitting surface intersects the optical axis of the objective optical system, and
the second right-angle prism has a first optical path, and
the third right-angle prism has a second optical path, and
a first optical image in the first optical path and a second optical image in the second optical path are both formed on the same plane, and
an area of the first optical image and an area of the second optical image are separated spatially.

Moreover, an image pickup apparatus of the present invention comprises,
the abovementioned optical unit, and
an image pickup element which has a single image pickup surface, wherein
a first optical image and a second optical image are captured on the single image pickup surface.

BRIEF DESCRIPTION OF THE DRAWINGS

FIG. 2A shows the overall splitting element and FIG. 2B shows an area near an image position in enlarged form;

FIG. 3A is a diagram showing an arrangement of the optical unit of the first embodiment, and FIG. 3B is a diagram showing an arrangement of a conventional optical unit;

DETAILED DESCRIPTION OF THE INVENTION

Reasons for and effects of adopting such an arrangement for an optical unit and an image pickup element according to the present embodiment will be described below by using the accompanying diagrams. However, the present invention is not restricted to the optical unit and the image pickup apparatus according to the present embodiment.

An optical unit of the present embodiment includes an objective optical system which includes a plurality of lenses, and a splitting element which is disposed on an image side of the objective optical system, wherein, the splitting element includes in order from a side of the objective optical system, a first right-angle prism, a second right-angle prism, and a third right-angle prism, and has a surface of incidence and an optical splitting surface, and the surface of incidence is provided to the first right-angle prism, and the first right-angle prism is positioned such that the surface of incidence is orthogonal to an optical axis of the objective optical system, and the optical splitting surface is provided to the second right-angle prism, and the second right-angle prism is positioned such that the optical splitting surface intersects the optical axis of the objective optical system, and the second right-angle prism has a first optical path, and the third right-angle prism has a second optical path, and a first optical image in the first optical path and a second optical image in the second optical path are both formed on the same plane, and an area of the first optical image and an area of the second optical image are separated spatially.

Figure 1:
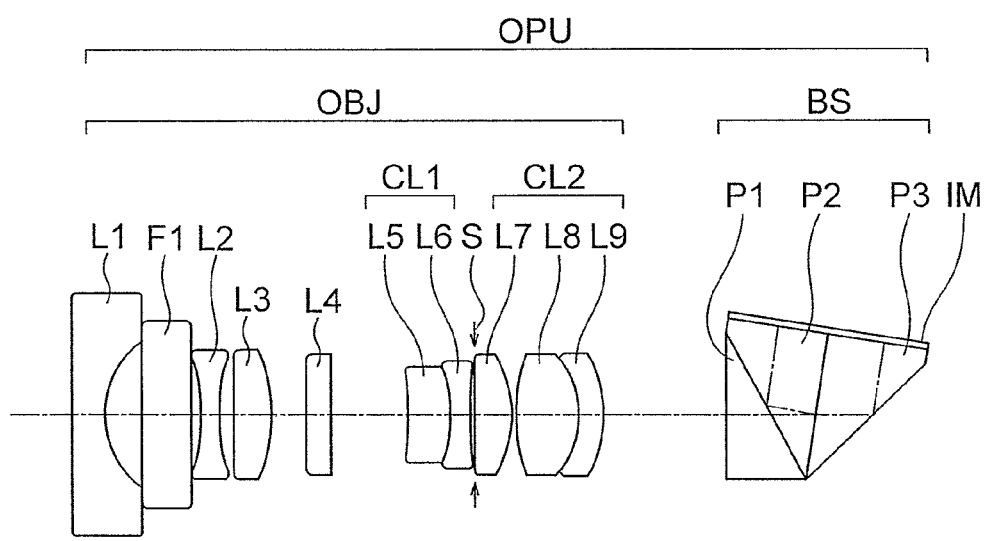
FIG. 1 is a diagram showing an arrangement of an optical unit according to a first embodiment.

An optical unit of a first embodiment will be described below. FIG. 1 is a diagram showing an arrangement of the optical unit of the first embodiment. An optical unit OPU of the first embodiment includes an objective optical system OBJ and a splitting element BS. The objective optical system OBJ includes a plurality of lenses.

The objective optical system OBJ includes a negative lens L1, a negative lens L2, a positive lens L3, a negative lens L4, a cemented lens CL1, a positive lens L7, and a cemented lens CL2. The cemented lens CL1 includes a positive lens L5 and a negative lens L6. The cemented lens CL2 includes a positive lens L8 and a negative lens L9.

An optical filter F1 is disposed between the negative lens L1 and the negative lens L2. Moreover, an aperture stop S is disposed between the negative lens L6 and the positive lens L7.

An optical image is formed by the objective optical system OBJ. The splitting element BS is disposed in an optical path from the objective optical system OBJ up to the optical image.

FIG. 1 shows not only an arrangement of the optical unit but also an arrangement of an image pickup apparatus. The image pickup apparatus includes the optical unit OPU and an image pickup element IM. By disposing the image pickup element IM at a position of the optical image, it is possible to capture the optical image.

The splitting element BS will be described below. FIG. 2 is a diagram showing the splitting element BS, where FIG. 2A is a diagram showing the overall splitting element BS and FIG. 2B is a diagram showing an area near an image position in enlarged form.

Figure 2A:
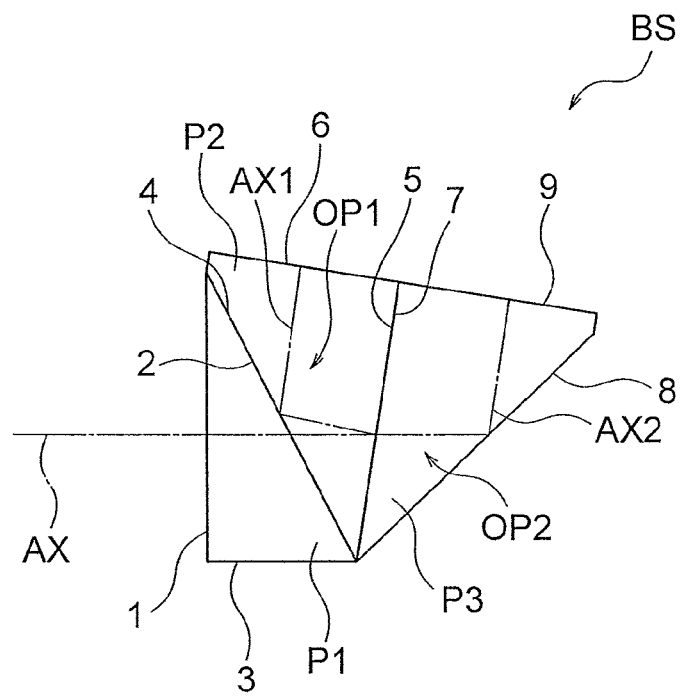
FIG. 2A and FIG. 2B are diagrams showing a splitting element BS, where.
Figure 2B:
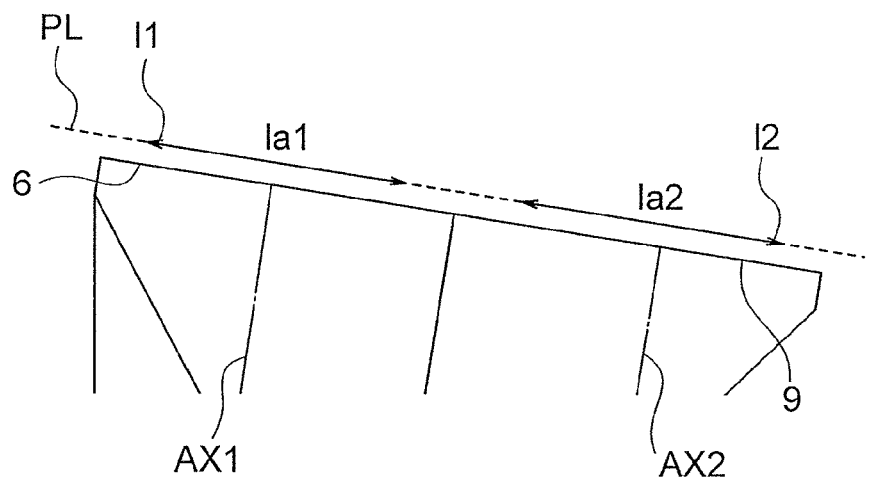

As shown in FIG. 2A, the splitting element BS includes in order from a side of the objective optical system OBJ, a first right-angle prism P1, a second right-angle prism P2, and a third right-angle prism P3. A gap is formed by air between the first right-angle prism P1 and the second right-angle prism P2, and the second right-angle prism P2 and the third right-angle prism P3 are cemented. The first right-angle prism P1, the second right-angle prism P2, and the third right-angle prism P3 are disposed along an optical axis AX of the objective optical system OBJ (hereinafter, referred to as 'optical axis AX'). Each apex angle of the right-angle prism may be provided with chamfering for spacing and making it easy to assemble. In other words, each edge of the right-angle prism may be chamfered.

The first right-angle prism P1 has an optical surface 1, an optical surface 2, and a non-optical surface 3. Each of the optical surface 1, the optical surface 2, and the non-optical surface 3 is a flat surface.

The optical surface 1 is positioned on the optical axis AX. The optical surface 1 is orthogonal to the optical axis AX. The optical surface 2 is positioned on the optical axis AX. The optical surface 2 is inclined with respect to the optical axis AX. The non-optical surface 3 is not positioned on the optical axis AX. The non-optical surface 3 is parallel to the optical axis AX. Here, the non-optical surface 3 is not necessarily required to be parallel.

In the first right-angle prism P1, an angle formed by the optical surface 1 and the optical surface 2 is the smallest apex angle. Therefore, in the first right-angle prism P1, both the optical surfaces forming the smallest apex angle are positioned on the optical axis AX.

The second right-angle prism P2 has an optical surface 4, an optical surface 5, and an optical surface 6. Each of the optical surface 4, the optical surface 5, and the optical surface 6 is a flat surface.

The optical surface 4 is positioned on the optical axis AX. The optical surface 4 is inclined with respect to the optical axis AX. The optical surface 5 is positioned on the optical axis AX. The optical surface 5 is inclined with respect to the optical axis AX. The optical surface 6 is not positioned on the optical axis AX. The optical surface 6 is inclined with respect to the optical axis AX.

In the second right-angle prism P2, an angle formed by the optical surface 4 and the optical surface 5 is the smallest apex angle. Therefore, in the second right-angle prism P2, both the optical surfaces forming the smallest apex angle are positioned on the optical axis AX.

The third right-angle prism P3 has an optical surface 7, an optical surface 8, and an optical surface 9. Each of the optical surface 7, the optical surface 8, and the optical surface 9 is a flat surface.

The optical surface 7 is positioned on the optical axis AX. The optical surface 7 is inclined with respect to the optical axis AX. The optical axis 8 is positioned on the optical axis AX. The optical surface 8 is inclined with respect to the optical axis AX. The optical surface 9 is not positioned on the optical axis AX. The optical surface 9 is inclined with respect to the optical axis AX.

In the third right-angle prism P3, an angle formed by the optical surface 7 and the optical surface 8 is the smallest apex angle. Therefore, in the third right-angle prism P3, both the optical surfaces forming the smallest apex angle are positioned on the optical axis AX. The second right-angle prism P2 and the third right-angle prism P3 have substantially same dimensions.

Light emerged from the objective optical system OBJ is incident on the optical surface 1. The optical surface 1 corresponds to the surface of incidence in the splitting element BS. In such manner, the surface of incidence in the splitting element BS is provided to the first right-angle prism P1. The optical surface 1 functions as a transmitting surface.

The optical surface 1 is orthogonal to the optical axis AX. Therefore, the first right-angle prism P1 is positioned such that the surface of incidence of the splitting element BS is orthogonal to the optical axis AX.

Light passed through the optical surface 1 is incident on the optical surface 2. The smallest apex angle in the first right-angle prism is set to be an angle which does not cause total reflection at the optical surface 2 of the light incident on the optical surface 2. Therefore, light incident on the optical surface 2 from a side of the optical surface 1 is transmitted through the optical surface 2. The optical surface 2 corresponds to the transmitting optical surface in the first right-angle prism P1.

Light transmitted through the optical surface 2 is emerged from the first right-angle prism P1. The second right-angle prism P2 is positioned adjacent to the first right-angle prism P1. Light emerged from the first right-angle prism P1 is incident on the second right-angle prism P2.

In the second right-angle prism P2, the optical surface 4 is face-to-face with the optical surface 2. In other words, the first right-angle prism P1 and the second right-angle prism P2 are positioned such that the optical surface 2 and the optical surface 4 are face-to-face.

Light emerged from the first right-angle prism P1 is incident on the optical surface 4. Moreover, as it will be described later, on the optical surface 4, light is incident from a side of the optical surface 5. The optical surface 4 corresponds to the transmitting reflective surface in the splitting element BS. The optical surface 4 functions as a transmitting surface and a reflecting surface.

The optical surface 4 functions as a transmitting surface for the light incident from a side of the first right-angle prism P1, and functions as a reflecting surface for the light incident from a side of the optical surface 5. Light incident on the optical surface 4 from the side of the first right-angle prism P1 is transmitted through the optical surface 4, and light incident on the optical surface 4 from the side of the optical surface 5 is reflected at the optical surface 4.

Light transmitted through the optical surface 4 is incident on the optical surface 5. The optical surface 5 corresponds to the optical splitting surface in the splitting element BS. The optical surface 5 functions as a transmitting surface and a reflecting surface. The optical surface 5 has predetermined transmittance characteristics (reflectance characteristics). A part of light incident on the optical surface 5 from a side of the optical surface 4 is reflected at the optical surface 5 according to the transmittance characteristics, and the remaining light is transmitted through the optical surface 5.

The optical surface 5 is provided to the second right-angle prism. Moreover, the optical surface 5 is positioned to intersect the optical axis AX. In such manner, the optical splitting surface in the splitting element BS is provided to the second right-angle prism P2. The second right-angle prism P2 is positioned such that the optical splitting surface of the splitting element BS intersects the optical axis AX.

Light reflected at the optical surface 5 is incident once again on the optical surface 5. As mentioned above, the optical surface 4 functions as a reflecting surface for light incident on the optical surface 4 from a side of the optical surface 5. The smallest apex angle in the second right-angle prism P2 is set to be an angle which causes total reflection at the optical surface 4 of light incident on the optical surface 4 from the side of the optical surface 5. Therefore, light incident on the optical surface 4 from the side of the optical surface 5 undergoes total reflection at the optical surface 4.

Light subjected to total reflection at the optical surface 4 is incident on the optical surface 6. The optical surface 6 corresponds to the surface of emergence in the splitting element BS. The optical surface 6 functions as a transmitting surface. Light incident on the optical surface 6 from the side of the optical surface 4 is transmitted through the optical surface 6.

Light transmitted through the optical surface 6 is emerged from the second right-angle prism P2. Moreover, as shown in FIG. 2B, a first optical image I1 is formed at a predetermined position. An optical axis AX1 in the optical surface 6 (hereinafter, referred to as 'optical axis AX1') is an optical axis of an optical path from the optical surface 4 up to the optical surface 6. The optical image I1 is formed on the optical axis AX1.

In the second right-angle prism P2, a first optical path OP1 is formed by an optical path from the optical surface 5 up to the optical surface 4 and the optical path from the optical surface 4 up to the optical surface 6. In such manner, the second right-angle prism P2 has the first optical path OP1.

On the other hand, light transmitted through the optical surface 5 is emerged from the second right-angle prism P2. The third right-angle prism P3 is positioned adjacent to the second right-angle prism P2. Light emerged from the second right-angle prism P2 is incident on the third right-angle prism P3.

In the third right-angle prism P3, the optical surface 7 and the optical surface 5 are face-to-face. In other words, the second right-angle prism P2 and the third right-angle prism P3 are cemented such that the optical surface 5 and the optical surface 7 make a contact. As a method for cementing two prisms, a method by a cementing material and a method by an optical contact are available. The second right-angle prism P2 and the third right-angle prism P3 may be cemented by any of the methods.

Light emerged from the second right-angle prism P2 is incident on the optical surface 7. The optical surface 7 corresponds to the object-side optical surface in the splitting element BS. The optical surface 7 functions as a transmitting surface. The light incident on the optical surface 7 from the second right-angle prism P2 is transmitted through the optical surface 7.

Light transmitted through the optical surface 7 is incident on the optical surface 8. The optical surface 8 corresponds to the image-side optical surface in the splitting element BS. The optical surface 8 functions as a reflecting surface. Light incident on the optical surface 8 from a side of the optical surface 7 is reflected at the optical surface 8.

Reflection of light at the optical surface 8 includes reflection of light due to total reflection and reflection of light which is not due to total reflection. In the former reflection, the smallest apex angle in the third right-angle prism P3 is set to be an angle which causes total reflection at the optical surface 8, of light which is incident on the optical surface 8 from a side of the optical surface 7. In the latter reflection, a reflective film is formed on the optical surface 8. In the splitting element BS shown in FIG. 1, the optical surface 8 is a total reflection surface.

Light reflected at the optical surface 8 is incident on the optical surface 9. The optical surface 9 corresponds to the surface of emergence in the splitting element BS. The optical surface 9 functions as a transmitting surface. The light incident on the optical surface 9 from a side of the optical surface 8 is transmitted through the optical surface 9.

Light transmitted through the optical surface 9 emerges from the third right-angle prism P3. Moreover, as shown in FIG. 2B, a second optical image I2 is formed at a predetermined position. An optical axis AX2 in the optical surface 9 (hereinafter, referred to as 'optical axis AX2') is an optical axis of an optical path from the optical surface 8 up to the optical surface 9. The second optical image I2 is formed on the optical axis AX2.

In the third right-angle prism P3, a second optical path OP2 is formed by an optical path from the optical surface 7 up to the optical surface 8 and the optical path from the optical surface 8 up to the optical surface 9. In such manner, the third right-angle prism has the second optical path OP2.

As shown in FIG. 2B, the predetermined position coincides with a same plane PL. Consequently, both the first optical image I1 and the second optical image I2 are formed on the same plane PL simultaneously. Moreover, a distance from the optical splitting surface up to the first optical image I1 and a distance from the optical splitting surface up to the second optical image I2 are substantially equal.

Moreover, an area Ia1 of the first optical image and an area Ia2 of the second optical image are separated spatially. In other words, the area Ia1 of the first optical image and the area Ia2 of the second optical image do not have a mutually overlapping area.

In FIG. 2B, the same plane PL does not coincide with the surface of emergence of the splitting element BS. However, the same plane PL may coincide with the surface of emergence of the splitting element BS.

Figure 3A:
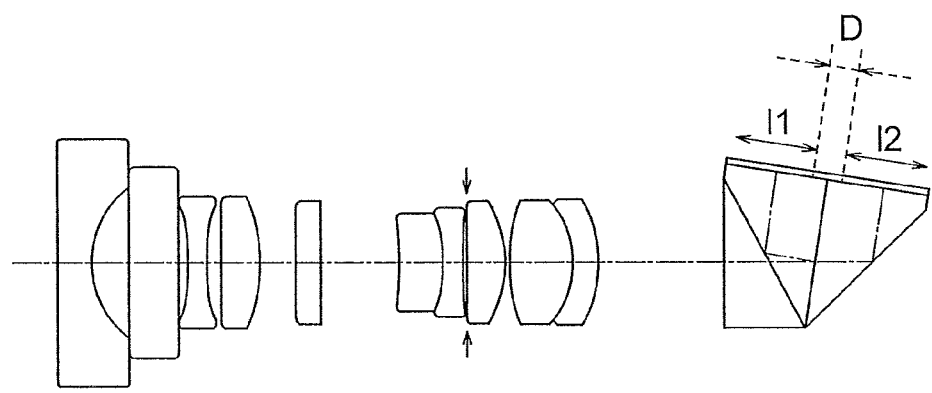
FIG. 3A and FIG. 3B are diagrams showing an arrangement of the optical unit, where.
Figure 3B:
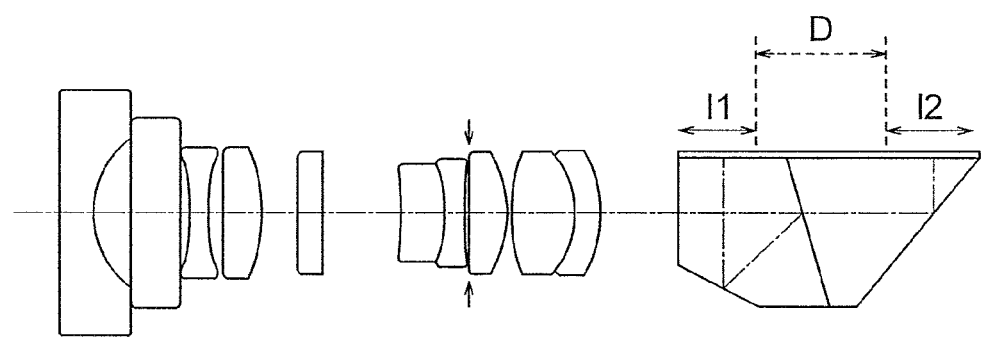

FIG. 3A and FIG. 33 are diagrams showing an arrangement of the optical unit, where, FIG. 3A is a diagram showing an arrangement of an optical unit of the first embodiment and FIG. 3B is a diagram showing an arrangement of a conventional optical unit.

An image is not formed in an area D between the first optical image I1 and the second optical image I2. When FIG. 3A and FIG. 3B are compared, the area D is narrower in the optical unit of the first embodiment than the area D in the conventional optical unit. In such manner, in the optical unit of the first embodiment, a distance between the two optical images does not widen.

Moreover, when FIG. 3A and FIG. 3B are compared, a distance from the optical splitting surface up to the second optical image I2 is shortened in the optical unit of the first embodiment than the distance in the conventional optical unit. Therefore, in the optical unit of the first embodiment, it is possible to make an overall length of the optical unit in the optical unit of the first embodiment shorter as compared to the overall length in the conventional optical unit.

Moreover, in a case of capturing the first optical image I1 and the second optical image I2 by a single image pickup element, in the optical unit according to the first embodiment, the area D is narrower as compared to the area D in the conventional optical unit. Consequently, in the optical unit according to the first embodiment, it is possible to make the image pickup surface of the image pickup element smaller as compared to the image pickup surface in the conventional optical unit.

Figure 4:
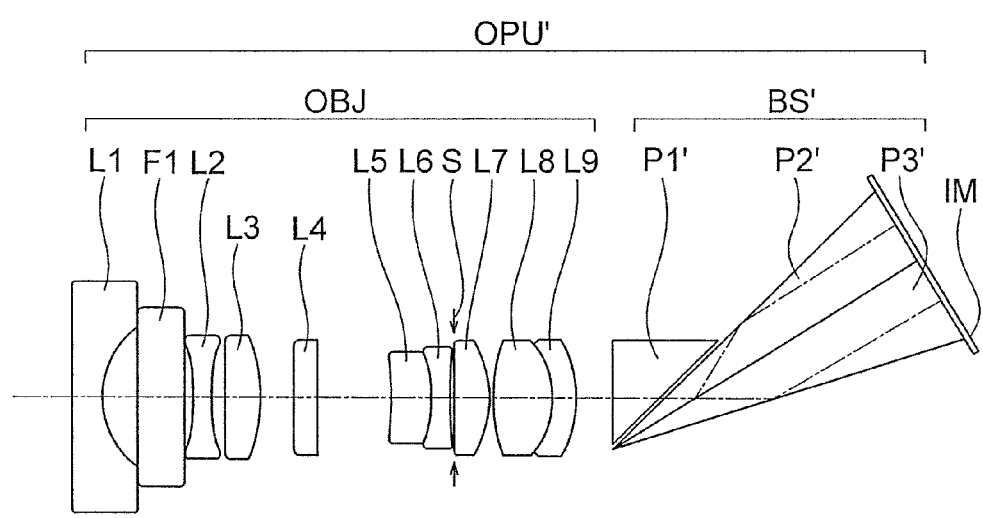
FIG. 4 is a diagram showing an arrangement of an optical unit of a second embodiment.

An optical unit of a second embodiment will be described below. FIG. 4 is a diagram showing an arrangement of the optical unit of the second embodiment. An optical unit OPU' of the second embodiment, as shown in FIG. 4, includes the objective optical system OBJ and a splitting element BS'. The objective optical system OBJ includes a plurality of lenses. The objective optical system OBJ shown in FIG. 4 is same as the objective optical system OBJ shown in FIG. 1.

An optical image is formed by the objective optical system OBJ. The splitting element BS' is disposed in an optical path from the objective optical system OBJ up to the optical image.

FIG. 4 shows not only the arrangement of the optical unit but also an arrangement of an image pickup apparatus. The image pickup apparatus includes the optical unit OPU' and the image pickup element IM. By disposing the image pickup element IM at a position of the optical image, it is possible to capture an optical image.

Figure 5:
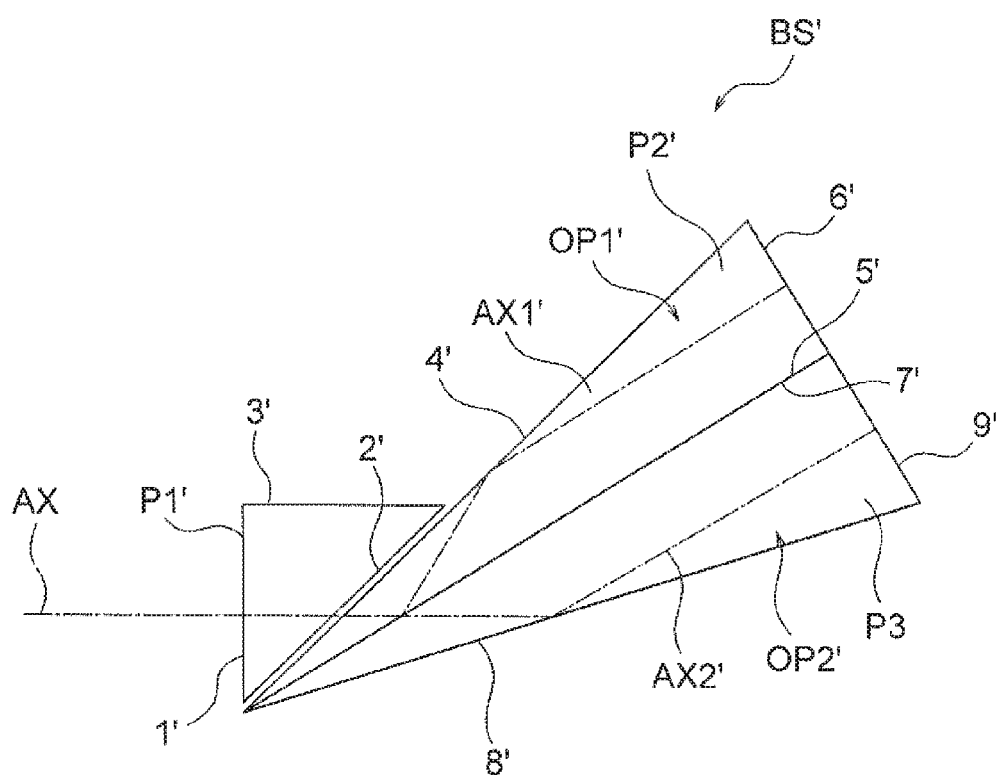
FIG. 5 is a diagram showing an overall splitting element BS'.

The splitting element BS' will be described below. FIG. 5 shows the overall splitting element BS'. A structure of the splitting element BS' is basically same as the structure of the splitting element BS. Therefore, a description in detail thereof is omitted.

As shown in FIG. 5, the splitting element BS' includes in order from a side of the objective optical system OBJ, a first right-angle prism P1', a second right-angle prism P2', and a third right-angle prism P3'. The first right-angle prism P1', the second right-angle prism P2', and the third right-angle prism P3', are disposed along an optical axis AX.

The first right-angle prism P1' has an optical surface 1', an optical surface 2', and an optical surface 3'. Each of the optical surface 1', the optical surface 2', and the optical surface 3' is a flat surface. The optical surface 3' may be a non-optical surface. The second right-angle prism P2' has an optical surface 4', an optical surface 5', and an optical surface 6'. Each of the optical surface 4', the optical surface 5', and the optical surface 6' is a flat surface. The third right-angle prism P3' has an optical surface 7', an optical surface 8', and an optical surface 9'. Each of the optical surface 7', the optical surface 8', and the optical surface 9' is a flat surface.

In the first right-angle prism P1', an angle formed by the optical surface 1' and the optical surface 2' is the smallest apex angle. Therefore, in the first right-angle prism P1', both the optical surfaces forming the smallest apex angle are positioned on the optical axis AX.

In the second right-angle prism P2', an angle formed by the optical surface 4' and the optical surface 5' is the smallest apex angle. Therefore, in the second right-angle prism P2', both the optical surfaces forming the smallest apex angle are positioned on the optical axis AX.

In the third right-angle prism P3', an angle formed by the optical surface 7' and the optical surface 8' is the smallest apex angle. Therefore, in the third right angle prism P3' both the optical surfaces forming the smallest apex angle are positioned on the optical axis AX.

The optical surface 1' corresponds to the surface of incidence in the splitting element BS'. In such manner, the surface of incidence in the splitting element BS' is provided to the first right-angle prism P1'.

Moreover, the optical surface 1' is orthogonal to the optical axis AX. Consequently, the first right-angle prism P1' is positioned such that the surface of incidence of the splitting element BS' is orthogonal to the optical axis AX.

The optical surface 2' corresponds to the transmitting optical surface in the first right-angle prism P1'. The optical surface 4' corresponds to the transmitting reflective surface in the splitting element BS'.

The optical surface 5' corresponds to the optical splitting surface in the splitting element BS'. Moreover, the optical surface 5' is positioned to intersect the optical axis AX. In such manner, the optical splitting surface in the splitting element BS' is provided to the second right-angle prism P2'. The second right-angle prism P2' is positioned such that the optical splitting surface of the splitting element BS' intersects the optical axis AX.

The optical surface 6' corresponds to the surface of emergence in the splitting element BS'. The light transmitted through the optical surface 6' is emerged from the second right-angle prism P2'. Moreover, a first optical image is formed at a predetermined position.

In the second optical prism P2', a first optical path OP1' is formed by an optical path from the optical surface 5' up to the optical surface 4' and an optical path from the optical surface 4' up to the optical surface 6'. In such manner, the second right-angle prism P2' has the optical path OP1'.

The optical surface 7' corresponds to the object-side optical surface in the splitting element BS'. The optical surface 8' corresponds to the image-side optical surface in the splitting element BS'.

The optical surface 9' corresponds to the surface of emergence in the splitting element BS'. Light transmitted through the optical surface 9' emerges from the third right-angle prism P3'. Moreover, a second optical image is formed at a predetermined position.

In the third right-angle prism P3', a second optical path OP2' is formed by an optical path from the optical surface 7' up to the optical surface 8' and the optical path from the optical surface 8' up to the optical surface 9'. In such manner, the third right-angle prism P3' has the second optical path OP2'.

The predetermined position coincides with a same plane. Consequently, both the first optical image and the second optical image are formed on the same plane simultaneously. Moreover, a distance from the optical splitting surface up to the first optical image and a distance from the optical splitting surface up to the second optical image are substantially equal.

Moreover, an area of the first optical image and an area of the second optical image are separated spatially. In other words, the area of the first optical image and the area of the second optical image do not have a mutually overlapping area.

The same plane may or may not coincide with the surface of emergence of the splitting element BS'.

Even in the optical unit of the second embodiment, an area D is narrower in the optical unit of the second embodiment than the area D in the conventional optical unit. In such manner, in the optical unit of the second embodiment, a distance between the two optical images does not widen.

Moreover, in a case of capturing the first optical image and the second optical image by a single image pickup element, in the optical unit according to the second embodiment, the area D is narrower as compared to the area D in the conventional optical unit. Consequently, in the optical unit according to the second embodiment, it is possible to make the image pickup surface of the image pickup element smaller as compared to the image pickup surface in the conventional optical unit.

Moreover, when the splitting element BS and the splitting element BS' are compared, an angle made by the optical axis AX and the optical axis AX1 is larger than an angle made by the optical axis AX and the optical axis AX1'. Similarly, an angle made by the optical axis AX and the optical axis AX2 is larger than an angle made by the optical axis AX and the optical axis AX2'. Consequently, positions at which the optical images are formed differ for the splitting element BS and the splitting element BS'. This signifies that it is possible to set the position of the image plane freely in the optical unit of the present embodiment.

Furthermore, both the surface of incidence in the splitting element BS and the surface of incidence in the splitting element BS' are orthogonal to the optical axis AX. Consequently, in the optical unit of the present embodiment, it is possible to suppress a decentration aberration.

In such manner, in the optical unit of the present embodiment, even when the image plane is set at any position, various aberrations in the optical unit are corrected favorably.

In the optical unit of the first embodiment and the optical unit of the second embodiment (hereinafter, referred to as 'optical unit of the present embodiment'), it is preferable that the optical splitting surface be a surface which divides an intensity of light incidence, into the first optical path and the second optical path in a predetermined proportion.

By making such arrangement, it is possible to form simultaneously, two optical images having same light intensity or two optical images having different light intensity, depending on an object of observation and a method of diagnosis. Moreover, by capturing optical images by the image pickup element, it is possible to acquire two images with different brightness.

It is preferable that the optical splitting surface be a half-mirror surface. By making such arrangement, it is possible to make a light intensity of the first optical image and a light intensity of the second optical image equal.

In the optical unit of the present embodiment, it is preferable that an optical-path length in the first optical path and an optical-path length in the second optical path differ.

By making such arrangement, it is possible to form simultaneously, two optical images with a different distance up to an object. For instance, it is possible to let a position of an object corresponding to the second optical image to be on an object side or on an image side of a position of an object corresponding to the first optical image. By making such arrangement, it is possible to connect consecutively, a depth of focus of the two images, and consequently, it is possible to form an optical image with a deep depth of field.

In a case where the optical splitting surface is a half-mirror surface, it is possible to make a brightness of the first optical image and a brightness of the second optical image substantially equal. Consequently, it is possible to form an optical image with a deep depth of field with no boundary existing where the brightness changes remarkably. Moreover, by capturing an optical image by the image pickup element, it is possible to acquire an image with a deep depth of field with no boundary existing where the brightness changes remarkably.

For making the optical-path length in the first optical path and the optical-path length in the second optical path to be different, a shape of the second right-angle prism and a shape of the third right-angle prism are made to be different.

In the optical unit of the present embodiment, it is preferable that the optical splitting surface be a surface which makes a direction of polarization of light in the first optical path and a direction of polarization of light in the second optical path different.

By making such arrangement, it is possible to form two optical images with different state of polarization simultaneously, depending on an object of observation and a method of diagnosis. Moreover, by capturing an optical image by the image pickup element, it is possible to acquire two images with different state of polarization.

A polarization beam splitter surface is an example of the optical splitting surface. By using the polarization beam splitter surface, it is possible to form an optical image of P-polarized light as the first optical image and an image of S-polarized light as the second optical image, for example.

In the optical unit of the present embodiment, it is preferable that the optical splitting surface be a surface which makes a wavelength of light in the first optical path and a wavelength of light in the second optical path different.

By making such arrangement, it is possible to form two optical images with different wavelength of light simultaneously, depending on an object of observation and a method of diagnosis. Moreover, by capturing an optical image by the image pickup element, it is possible to acquire two images with different wavelength of light.

A dichroic-mirror surface is an example of the optical splitting surface. By using the dichroic-mirror surface, it is possible to form an optical image of a short wavelength (an optical image of blue color for example) as the first optical image, and an optical image of a long wavelength (an optical image of red color for example) as the second optical image.

Moreover, by capturing an image by the image pickup element, it is possible to acquire an image of light of a short wavelength (an image of blue color for example) and an image of light of a long wavelength (an image of red color for example).

In the optical unit of the present embodiment, it is preferable that the optical-path length in the first optical path and the optical-path length in the second optical path be same.

By making such arrangement, it is possible to form two optical images with different optical information simultaneously, from one object.

For making the optical-path length in the first optical path and the optical-path length in the second optical path to be same, a shape of the second right-angle prism and a shape of the third right-angle prism are made to be same.

In the optical unit of the present embodiment, it is preferable that an air gap be provided between the first right-angle prism and the second right-angle prism.

In the optical unit of the present embodiment, the light reflected at the optical surfaces 5 and 5' is subjected to total reflection at the optical surfaces 4 and 4'. In other words, the light reflected at the optical splitting surface is subjected to total reflection at the transmitting reflective surface.

Both an axial light beam and an off-axial light beam from the side of the objective optical system OBJ are incident as convergent light beams on the optical surfaces 4 and 4'. Moreover, each of the axial light beam and the off-axis light beam passes through the optical surfaces 4 and 4', then reflected at the optical surfaces 5 and 5', and reaches the optical surfaces 4 and 4' once again.

FIG. 2A shows a case in which an angle made by the optical axis AX and the optical axis AX1 is large. In this case, a position of the optical axis AX1 in the optical surface 4 becomes close to a position of the optical axis AX in the optical surface 4. As the position of the optical axis AX1 becomes close to the position of the optical axis AX, the optical surface 5 comes closer to a state of being orthogonal to the optical axis AX.

Light is incident on the optical surface 4 from the optical surface 5 at various angles of incidence with respect to the optical surface 4. As the optical surface 5 comes closer to a state of being orthogonal to the optical axis AX, light of the angle of incidence smaller than a critical angle, with respect to the optical surface 4, increases. In other words, light not subjected to total reflection at the optical surface 4 increases.

Light which is not subjected to total reflection become a cause of ghost and flare. For preventing the occurrence of ghost and flare, it is necessary to make thin a light beam which forms an optical image, and to prevent the occurrence of light which is not subjected to total reflection at the optical surface 4. However, when the light beam is made thin, a brightness of the optical image is degraded.

Therefore, an air gap is to be provided between the first right-angle prism P1 and the second right-angle prism P2. By making such arrangement, it is possible to make the critical angle at the optical surface 4 larger than a critical angle when the first right-angle prism P1 and the second right-angle prism P2 are cemented. Consequently, it is possible to let the light to be subjected to total reflection at the optical surface 4 without making a light-beam diameter thin, as compared to a case in which the first right-angle prism 21 and the second right-angle prism P2 are cemented.

FIG. 5 shows a case in which an angle made by the optical axis AX and the optical axis AX1' is large. In this case, the optical surface 5' is far away from a state of being orthogonal to the optical axis AX'. Consequently, there is almost no light generated for which the angle of incidence at the optical surface 4 smaller than the critical angle.

As a result, it is possible to let a light beam of a large diameter to be subjected to total reflection at the optical surface 4' even without providing an air gap between the first right-angle prism P1' and the second right-angle prism P2'. As a matter of course, an air gap may be provided between the first right-angle prism P1' and the second right-angle prism P2'.

In the optical unit of the present embodiment, it is preferable that the splitting element have a surface of emergence at a position facing the same plane, and the following conditional expression (1) be satisfied:

$$20° < \alpha < 85° \quad (1)$$

where, $\alpha$ denotes an angle made by the axis of the objective optical system and an axis in the surface of emergence.

In a case of falling below a lower limit value of conditional expression (1), the overall length of the spitting element becomes long. Furthermore, the area D between the first optical image and the second optical image becomes wide. Consequently, in a case of capturing the first optical image and the second optical image by a single image pickup element, it becomes difficult to make the image pickup surface of the image pickup element small.

In a case of exceeding an upper limit value of conditional expression (1), in the first right-angle prism, the angle made by the optical surface 1 and the optical surface 2 becomes excessively small. Consequently, manufacturing of the first right-angle prism becomes difficult. Moreover, since the light-beam diameter becomes excessively small, it becomes difficult to form a bright optical image.

The optical axis in the surface of emergence is parallel to the optical surface 5 and the optical surface 7. Consequently, an angle made by the optical axis of the objective optical system and the optical axis in the surface of emergence is equal to an angle made by the optical axis of the objective optical system and the optical surface 5, or the angle made by the optical axis of the objective optical system and the optical surface 7.

In the optical unit of the present embodiment, it is preferable that the first right-angle prism have a transmitting optical surface, and an apex angle made by the surface of incidence and the transmitting optical surface be 30°, and the second right-angle prism have a transmitting reflective surface, and an apex angle made by the transmitting reflective surface and the optical splitting surface be 40°, and the third right-angle prism have an object-side optical surface and an image-side optical surface, and an apex angle made by the object-side optical surface and the image side optical surface be 40°.

By making such arrangement, it is possible to realize an optical unit in which a distance between the adjacent optical images is narrow and a position of an optical image formed is not restricted, and furthermore, the overall length of the optical unit is short.

In the optical unit of the present embodiment, it is preferable that the first right-angle prism have a transmitting optical surface, and an apex angle formed by the surface of incidence and the transmitting optical surface be 45°, the second right-angle prism have a transmitting reflective surface, and an apex angle formed by the transmitting reflective surface and the optical splitting surface be 15°, and the third right-angle prism have an object-side optical surface and an image-side optical surface, and an apex angle formed by the object-side optical surface and the image-side optical surface be 15°.

By making such arrangement, it is possible to realize an optical unit in which a distance between the adjacent optical images is narrow, and a position of an optical image formed is not restricted.

The image pickup apparatus of the present embodiment includes the abovementioned optical unit and an image pickup element which has a single image pickup surface, and a first optical image and a second optical image are captured by the single image pickup surface.

By making such arrangement, it is possible to realize an image pickup apparatus in which the image pickup surface of the image pickup element is small, and a position of disposing the image pickup element is not restricted. Moreover, it is possible to realize an image pickup apparatus having a short overall length.

Figure 6:
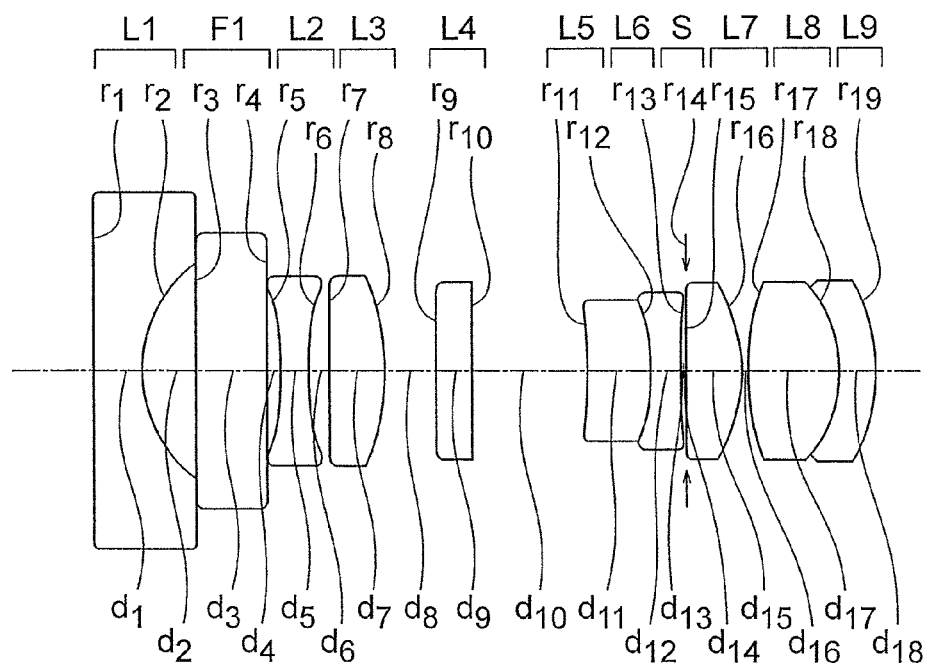
FIG. 6 is a diagram showing an example of an objective optical system.

An example of the objective optical system used in the optical unit of the present embodiment is shown in FIG. 6.

An objective optical system OBJ includes a planoconcave negative lens L1, a biconcave negative lens L2, a biconvex positive lens L3, a planoconcave negative lens L4, a positive meniscus lens L5 having a convex surface directed toward an image side, a biconcave negative lens L6, a planoconvex positive lens L7, a biconvex positive lens L8, and a negative meniscus lens L9 having a convex surface directed toward the image side.

The positive meniscus lens L5 and the biconcave negative lens L6 are cemented. Moreover, the biconvex positive lens L8 and the negative meniscus lens L9 are cemented.

An optical filter F1 is disposed between the planoconcave negative lens L1 and the biconcave negative lens L2. Moreover, an aperture stop S is disposed between the biconcave negative lens L6 and the planoconvex positive lens L7.

Numerical data of example described above is shown below. In symbols, r denotes radius of curvature of each surface, d denotes a thickness of each optical component or an air distance, nd denotes a refractive index of each optical component for d-line, vd denotes an Abbe number for each optical component.

EXAMPLE

| Surface no. | r | d | nd | vd |
|---|---|---|---|---|
| Object plane | ∞ | d0 | | |
| 1 | ∞ | 0.6561 | 1.88300 | 40.76 |
| 2 | 1.9220 | 0.8049 | | |
| 3 | ∞ | 0.9841 | 1.51800 | 75.00 |
| 4 | ∞ | 0.1698 | | |
| 5 | −5.6263 | 0.3856 | 1.88300 | 40.76 |
| 6 | 3.3960 | 0.3075 | | |
| 7 | 93.7165 | 0.7666 | 1.92286 | 18.90 |
| 8 | −3.7545 | 0.7132 | | |
| 9 | −79.2437 | 0.4920 | 1.51633 | 64.14 |
| 10 | ∞ | 1.5581 | | |
| 11 | −62.7030 | 0.878 | 1.92286 | 18.90 |
| 12 | −2.8707 | 0.4100 | 2.00330 | 28.27 |
| 13 | 8.2363 | 0.0328 | | |
| 14 (Stop) | ∞ | 0.0492 | | |
| 15 | ∞ | 0.7784 | 1.48749 | 70.23 |
| 16 | −2.3726 | 0.0820 | | |
| 17 | 3.6087 | 1.2486 | 1.48749 | 70.23 |
| 18 | −1.8711 | 0.4920 | 1.92286 | 18.90 |
| 19 | −2.9189 | (D10) | | |

Figure 7:
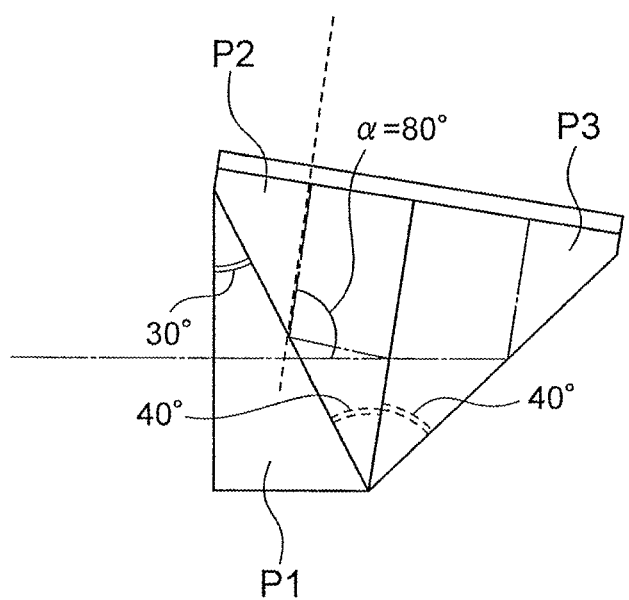
FIG. 7 is a diagram showing an example 1 of a splitting element.
Figure 8:
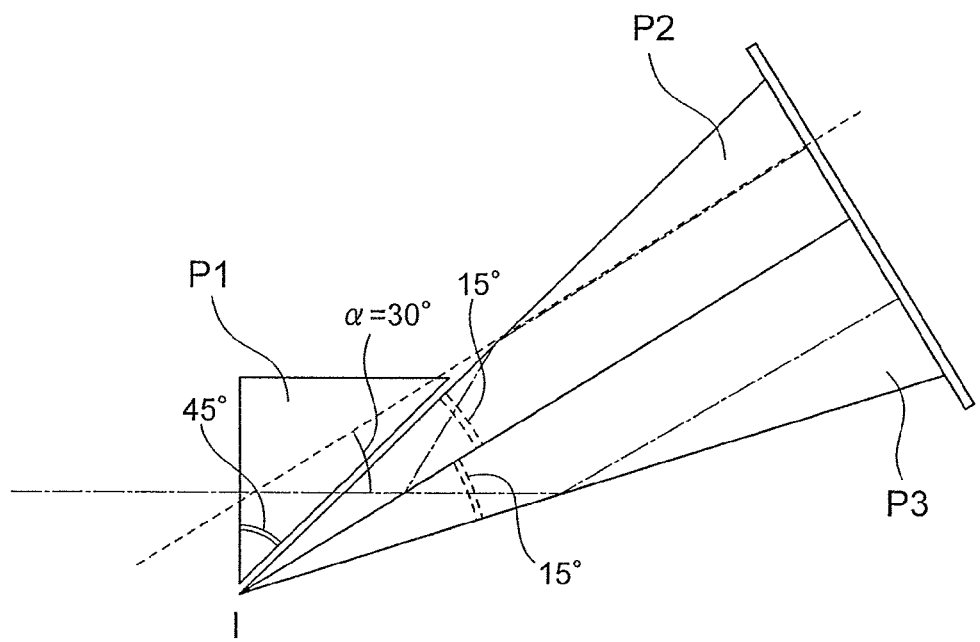
FIG. 8 is a diagram showing an example 2 of a splitting element.

Examples of the splitting element used in the optical unit of the present embodiment are shown in FIG. 7 and FIG. 8. FIG. 7 is a diagram showing a splitting element of an example 1. FIG. 8 is a diagram showing a splitting element of an example 2.

The splitting element of the example 1 includes a first right-angle prism P1, a second right-angle prism P2, and a third right-angle prism P3. Angles in the prisms are as follows.

angle α made by an optical axis of an objective optical system and an optical axis in a surface of emergence: 80° smallest apex angle in the first right-angle prism: 30° smallest apex angle in the second right-angle prism: 40° smallest apex angle in the third right-angle prism: 40°

The splitting element of the example 2 includes a first right-angle prism 21, a second right-angle prism P2, and a third right-angle prism P3. Angles in the prisms are as follows.

angle α made by an optical axis of an objective optical system and an optical axis in a surface of emergence: 30° smallest apex angle in the first right-angle prism: 45° smallest apex angle in the second right-angle prism: 15° smallest apex angle in the third right-angle prism: 15°

According to the present invention, it is possible to provide an optical unit in which it is possible to set a position of an image plane freely without widening a distance between the two optical images, and to form an image on the same plane without changing substantially a focusing position. Moreover, it is possible to provide an image pickup apparatus in which an image pickup surface of an image pickup element is small, and it is possible to set a position of the image pickup element freely.

As described above, the present invention is useful for an optical unit in which it is possible to set a position of an image plane freely without a distance between two optical images being widened, and an aberration is corrected favorably. Moreover, the present invention is useful for an image pickup element in which an image pickup surface of an image pickup element is small, and it is possible to set a position of the image pickup element freely, and to acquire an image of a high resolution.

What is claimed is:

1. An optical unit comprising:
   an objective optical system which includes a plurality of lenses; and
   a splitting element which is disposed on an image side of the objective optical system, wherein:
   the splitting element consists of in order from a side of the objective optical system, a first right-angle prism, a second right-angle prism, and a third right-angle prism, and has a surface of incidence and an optical splitting surface, and
   the surface of incidence is provided to the first right-angle prism, and
   the first right-angle prism is positioned such that the surface of incidence is orthogonal to an optical axis of the objective optical system, and
   the optical splitting surface is provided to a boundary of the second right-angle prism and the third right-angle prism, and
   the second right-angle prism is positioned such that the optical splitting surface intersects the optical axis of the objective optical system, and
   the second right-angle prism has a first optical path, and
   the third right-angle prism has a second optical path, and
   a first optical image in the first optical path and a second optical image in the second optical path are both formed on the same plane, and
   an area of the first optical image and an area of the second optical image are separated spatially.

2. The optical unit according to claim 1, wherein the optical splitting surface is a surface which divides an intensity of light incidence, into the first optical path and the second optical path in a predetermined proportion.

3. The optical unit according to claim 1, wherein an optical-path length of the first optical path and an optical-path length of the second optical path differ.

4. The optical unit according to claim 1, wherein the optical splitting surface is a surface which makes a direction of polarization of light in the first optical path and a direction of polarization of light in the second optical path different.

5. The optical unit according to claim 1, wherein the optical splitting surface is a surface which makes a wavelength of light in the first optical path and a wavelength of light in the second optical path different.

6. The optical unit according to claim 4, wherein an optical-path length of the first optical path and an optical-path length of the second optical path are same.

7. An optical unit comprising:
   an objective optical system which includes a plurality of lenses; and
   a splitting element which is disposed on an image side of the objective optical system, wherein:
   the splitting element includes in order from a side of the objective optical system, a first right-angle prism, a second right-angle prism, and a third right-angle prism, and has a surface of incidence and an optical splitting surface, and
   the surface of incidence is provided to the first right-angle prism, and
   the first right-angle prism is positioned such that the surface of incidence is orthogonal to an optical axis of the objective optical system, and
   the optical splitting surface is provided to the second right-angle prism, and
   the second right-angle prism is positioned such that the optical splitting surface intersects the optical axis of the objective optical system, and
   the second right-angle prism has a first optical path, and
   the third right-angle prism has a second optical path, and
   a first optical image in the first optical path and a second optical image in the second optical path are both formed on the same plane, and
   an area of the first optical image and an area of the second optical image are separated spatially, and
   the splitting element has a surface of emergence at a position facing the same plane, and
   the following conditional expression (1) is satisfied:

$$20° < \alpha < 85° \tag{1}$$

where,
   α denotes an angle made by the axis of the objective optical system and an axis in the surface of emergence.

8. The optical unit according to claim 1, wherein:
   the first right-angle prism has a transmitting optical surface, and
   an apex angle formed by the surface of incidence and the transmitting optical surface is 30°, and
   the second right-angle prism has a transmitting reflective surface, and
   an apex angle formed by the transmitting reflective surface and the optical splitting surface is 40°, and
   the third prism has an object-side optical surface and an image-side optical surface, and
   an apex angle formed by the object-side optical surface and the image-side optical surface is 40°.

9. The optical unit according to claim 1, wherein:
   the first right-angle prism has a transmitting optical surface, and
   an apex angle formed by the surface of incidence and the transmitting optical surface is 45°, and
   the second right-angle prism has a transmitting reflective surface, and
   an apex angle formed by the transmitting reflective surface and the optical splitting surface is 15°, and
   the third prism has an object-side optical surface and an image-side optical surface, and
   an apex angle formed by the object-side optical surface and the image-side optical surface is 15°.

10. An image pickup apparatus comprising:
    the optical unit according to claim 1; and
    an image pickup element which has a single image pickup surface, wherein
    the first optical image and the second optical image are captured on the single image pickup surface.

11. An image pickup apparatus comprising:
    the optical unit according to claim 7; and
    an image pickup element which has a single image pickup surface, wherein
    the first optical image and the second optical image are captured on the single image pickup surface.

12. An optical unit comprising:
    an objective optical system which includes a plurality of lenses; and
    a splitting element which is disposed on an image side of the objective optical system, wherein:
    the splitting element includes in order from a side of the objective optical system, a first right-angle prism, a second right-angle prism, and a third right-angle prism, and has a surface of incidence and an optical splitting surface, and
    the surface of incidence is provided to the first right-angle prism, and the first right-angle prism is positioned such that the surface of incidence is orthogonal to an optical axis of the objective optical system, and the optical splitting surface is provided to the second right-angle prism, and the second right-angle prism is positioned such that the optical splitting surface intersects an optical axis which is orthogonal to the surface of incidence, and the second right-angle prism has a first optical path, and the third right-angle prism has a second optical path, and a first optical image in the first optical path and a second optical image in the second optical path are both formed on the same plane, and an area of the first optical image and an area of the second optical image are separated spatially.

* * * * *

UNITED STATES PATENT AND TRADEMARK OFFICE
CERTIFICATE OF CORRECTION

PATENT NO. : 9,945,992 B2  
APPLICATION NO. : 15/717775  
DATED : April 17, 2018  
INVENTOR(S) : Hiroyuki Homma Page 1 of 1

It is certified that error appears in the above-identified patent and that said Letters Patent is hereby corrected as shown below:

In the Specification

Column 7, Line 36, delete "33" and insert --3B--.

Column 8, Line 51, after "P3'" insert --,--.

Column 12, Line 19, delete "21" and insert --P1--.

Column 14, Line 40, delete "21," and insert --P1,--.

Signed and Sealed this  
Fourteenth Day of August, 2018

Andrei Iancu  
*Director of the United States Patent and Trademark Office*